Patented Oct. 22, 1940

2,218,695

UNITED STATES PATENT OFFICE 2,218,695

PROCESS FOR MAKING SYNTHETIC MANURE

Martin Leatherman, Hyattsville, Md.; dedicated to the free use of the People of the United States of America No Drawing. Application July 18, 1938,
Serial No. 219,783

23 Claims. (Cl. 71—8)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a process for producing a synthetic manure from plant residues and the product formed by the said process.

Various methods are known for treating straw and other plant residues to facilitate their decomposition into material suitable for use as beneficial soil conditioners and plant stimulants, some of which embrace incorporating into the soil upon which the growing plants are feeding, undecomposed straw and plant residues. These methods are very harmful to growing plants because micro-organisms feeding upon and decomposing the plant residues find insufficient nitrogenous matter in these residues and draw upon the soil for their supply. In so doing they deprive the plants of nitrogen and interfere with their development.

Unlike undecomposed plant residues, barnyard manure is not detrimental to plants but is highly beneficial when incorporated into soil in which plants are growing, because this manure contains enough nitrogenous matter to largely satisfy the demands of the microbiological processes by which the cellulosic constituents are decomposed and, in addition, manure contains traces of hormones or chemicals which stimulate root formation of plants. This accelerated root development increases the feeding capacity of growing plants and thus insures a more adequate and amplified food supply.

These vital factors have not been fully appreciated heretofore and progress in this field has gone no further than the superficial treating of plant residues with nitrogenous and other food matter to facilitate their decomposition. The methods used have been highly inefficient and in some cases have required cumbersome machinery in order to carry them out at all. In all cases excessive volumes of water have been required to bring about the desired end, and, in addition, the length of time required before the plant residues have reached a suitable and safe stage of decomposition has been at least three months during which time constant care has been necessary to insure the continuity of the decomposition processes. It is well-known that straw, leaves, stems, stalks, and plant residues generally have water-repellent surfaces and the methods of the prior art have required excessive volumes of water in order to overcome this water-repellency and to insure sufficient water absorption into the plant residues to meet the needs of micro-organisms feeding upon the said residues. Ordinarily, approximately 1000 gallons of water per ton of plant residues are necessary. It has also been necessary to apply this water in small amounts over a considerable time interval in order to introduce sufficient moisture into the plant residues. This method inevitably results in large losses of the added nitrogenous matter. This has necessitated the initial addition of as much as a three-fold excess of nitrogen to the plant residues to insure a sufficient supply for the needs of the micro-organisms.

My invention seeks to avoid all of these objections and deficiencies in the prior art, by permitting the addition of just enough nitrogenous and other plant food to meet the actual needs of the microbiological processes and by avoiding substantially all loss of such economically valuable plant foods. Also, my invention insures intimate distribution of added nitrogenous and other plant foods through the tissues and structure of the plant residues and thereby greatly accelerates the speed of the processes whereby the plant residues are decomposed into a form suitable for use as a beneficial soil conditioner and manure. In fact, my invention permits immediate use of the said plant residues as a manure, that is, they can be plowed under immediately after treatment just as barnyard manure is plowed under and no harmful results appear to result therefrom. Microbiological processes within the soil speedily change the plant residues into humus.

Furthermore, my invention obviates the use of excessive volumes of water in treating the plant residues and substantially no water is wasted. All of that which is used is absorbed by the straw, leaves, stalks or other plant residues which are being treated. I have found that one ton of straw will absorb the whole of 300 gallons of water at one time without loss.

It is well known that cellulose-decomposing molds and bacteria flourish most luxuriantly when the hydrogen-ion concentration of the culture medium is at the optimum value closely approximating the range of pH 6.8 to 7+. In treating plant residues by my process the hydrogen-ion concentration can be easily adjusted to this optimum value.

Briefly, my invention consists of a proper proportion of desired compost chemicals admixed with a non-toxic surface tension-depressing agent the whole of which, when added to a specified volume of water, forms a nutrient solution of high penetrating power. That is, when this solution is sprinkled over plant residues, these residues absorb the solution with great avidity and all parts thereof become fully impregnated with the nutrient solution. Thereafter, all that is necessary to insure luxuriant growth of micro-organisms and resulting decomposition of the plant residues is to either replace the water lost by evaporation or to maintain the moisture content by burying the plant residues in the soil. Once the nutrient salts and non-toxic surface tension-depressing agent are introduced into the interior of the plant residues by my process, conditions are made very suitable for the rapid growth of cellulose-utilizing micro-organisms and the changes produced by the action of these organisms on the plant residues speedily increases the water holding capacity of the material. A very marked difference can be observed by visual and olefactory examination when two samples of straw or other suitable material are treated with identical solutions of nutrient salts one of which contains a non-toxic surface tension-depressing agent. The difference lies in the speed with which the decomposition processes are induced and in the stage of completion reached in a given time. In my experiments samples of straw were soaked for the same length of time in the respective solutions and then packed into quart glass jars and placed in a moist atmosphere under bell jars in a warm dark location. No further water was added directly to the straw but sufficient water was kept under the bell jars to maintain an approximately saturated atmosphere in contact with the straw in order to prevent drying out of the straw. Within five weeks the straw which had been treated with the nutrient solution containing a surface tension-depressing agent was converted into a rich dark brown product resembling well decomposed manure, whereas the other sample was in a much less advanced stage of decomposition.

In another experiment I treated 150 pounds of straw with a nutrient salt solution containing a surface tension-depressing agent for the purpose of preparing a hotbed. Forty-seven gallons of solution were applied by means of an ordinary sprinkling can and substantially all of the solution was absorbed by the straw as fast as it could be applied. The straw was treated on a concrete slab and the amount of solution not absorbed by the straw was determined to be not more than one or two per cent of the amount applied to the straw.

The straw was immediately forked into the hotbed and covered with the soil necessary for planting seeds. Heating of the straw was evident within three days as indicated by condensation of moisture on the lower side of the glass. Within one week the soil temperature had risen to 54° F. from a temperature of approximately 32° F. and seeds were planted. These results are similar to those obtained by the use of horse manure.

Straw treated according to my invention does not form toxic substances that prevent plant growth.

An example of the composition of a nutrient salt solution suitable for use in the practicing of my invention is as follows: 1000 parts water, 3 parts sodium nitrate, 1 part potassium dihydrogen phosphate, 0.25 part magnesium sulphate, 0.25 part potassium chloride, and 1 part surface tension-depressing agent. Another example is: 100 parts water, 1.78 parts potassium nitrate, 0.45 part sodium dihydrogen phosphate, 0.25 part magnesium sulphate, 0.125 part sodium chloride, and 1 part surface tension-depressing agent. It is obvious that these formulae have many equivalents with respect to all of the above-mentioned constituents and their respective proportions.

The following compounds have been found satisfactory as surface tension-depressing agents: the water soluble salts of sulphate esters of fatty alcohols containing twelve or more carbon atoms in straight or branched chains, sulphonated wool fat, sulphonated pine oil, sulphonates of naphthenic acid or derivatives thereof such as sodium isopropyl naphthalene sulphonate, esters of sulphocarboxylic acids such as sodium dioctyl sulphosuccinate, sodium or potassium diamylsulphomaleate and diamylsulphosuccinate, sodium dilauryl or dicapryl sulphosuccinates, sodium diethoxy ethyl sulpho-pyrotartrate, sodium dibenzylsulphoadipate, dibutyl sodium sulphosebacate, sodium distearylsulphosuccinate, sulphonated vegetable oils, soaps derived from saponification of vegetable and animal fats by alkali, and many other surface tension-depressing agents. Ordinarily, it is not advisable to use less than 0.01 of one per cent or more than 1.0 per cent of such agents in the nutrient salt solution as based upon the weight of water employed.

Nutrient solutions ordinarily used for treating plant residues or any one or more of various hormone-like chemicals which are known to stimulate root development in cuttings and plants, may be added. For example, from 0.2 to 8.0 parts of indoleacetic acid, naphthalene acetic acid, phenylacetic acid, guanidine or similar acting materials, per million part of water may be added.

Having thus disclosed my invention, I claim:

1. The process comprising treating plant residues with water solutions of inorganic nutrient salts containing an agent having the property of destroying the normal water repellent characteristic of plant residues without inhibiting fermentation, thence decomposing the material treated by fermentation.

2. The process comprising treating plant residues with water solutions of inorganic nutrient salts containing 0.01 to 1.0%, per weight of the water, of an agent having the property of destroying the normal water repellent characteristic of plant residues without inhibiting fermentation, thence decomposing the material so treated by fermentation.

3. In the process of making a fertilizer material, the step consisting of adding an aqueous nutrient solution to a plant residue material, said solution containing an agent having the property of destroying the normal water repellent characteristic of the said material without inhibiting fermentation, thence decomposing the material so treated by fermentation.

4. In the process of making a fertilizer material, the step consisting of adding an aqueous nutrient solution to a cellulose material, said solution containing an agent having the property of destroying the normal water repellent characteristic of said cellulose material without inhibiting fermentation, thence decomposing the cellulose material so treated by fermentation.

5. In the process of making a fertilizer material, the step consisting of adding an aqueous nutrient solution to a carbohydrate material, said solution containing an agent having the property of destroying the normal water repellent characteristic of said carbohydrate material without inhibiting fermentation, thence decomposing the carbohydrate material so treated by fermentation.

6. In the process of making a fertilizer material, the step consisting of saturating a cellulose material with an aqueous nutrient solution containing an agent having the property of destroying the normal water repellent characteristic of the cellulose material without inhibiting fermentation, thence decomposing the cellulose material so treated by fermentation.

7. In the process of making a fertilizer material, the step consisting of saturating a cellulose material with an aqueous nutrient solution containing an agent having the property of destroying the normal water repellent characteristic of the cellulose material without inhibiting fermentation, and thence interring the saturated material at the plant propagating situs.

8. In the process of making a fertilizer material, the step consisting of saturating a cellulose material with an aqueous nutrient solution containing a water-soluble salt of the class of sulphate esters of fatty alcohols containing twelve or more carbon atoms in straight or branched chains, thence decomposing the material so treated by fermentation.

9. In the process of making a fertilizer material, the step consisting of saturating a cellulose material with an aqueous nutrient solution containing a sulphonated wool fat, thence decomposing the material so treated by fermentation.

10. In the process of making a fertilizer material, the step consisting of saturating a cellulose material with an aqueous nutrient solution containing a sulphonated pine oil, thence decomposing the material so treated by fermentation.

11. In the process of making a fertilizer material, the step consisting of saturating a cellulose material with an aqueous nutrient solution containing a sulphonate of naphthenic acid or one of its derivatives, thence decomposing the material so treated by fermentation.

12. In the process of making a fertilizer material, the step consisting of saturating a cellulose material with an aqueous nutrient solution containing sodium isopropyl naphthalene sulphonate, thence decomposing the material so treated by fermentation.

13. In the process of making a fertilizer material, the step consisting of saturating a cellulose material with an aqueous nutrient solution containing an ester of sulphocarboxylic acid, thence decomposing the material so treated by fermentation.

14. In the process of making a fertilizer material, the step consisting of saturating a cellulose material with an aqueous nutrient solution containing sodium dioctyl sulphosuccinate, thence decomposing the material so treated by fermentation.

15. In the process of making a fertilizer material, the step consisting of saturating a cellulose material with an aqueous nutrient solution containing sodium or potassium diamylsulphomaleate, thence decomposing the material so treated by fermentation.

16. In the process of making a fertilizer material, the step consisting of saturating a cellulose material with an aqueous nutrient solution containing sodium or potassium diamylsulphosuccinate, thence decomposing the material so treated by fermentation.

17. In the process of making a fertilizer material, the step consisting of saturating a cellulose material with an aqueous nutrient solution containing sodium dilauryl, thence decomposing the material so treated by fermentation.

18. In the process of making a fertilizer material, the step consisting of saturating a cellulose material with an aqueous nutrient solution containing dicapryl sulphosuccinate, thence decomposing the material so treated by fermentation.

19. In the process of making a fertilizer material, the step consisting of saturating a cellulose material with an aqueous nutrient solution containing sodium diethoxy ethyl sulpho-pyrotartrate, thence decomposing the material so treated by fermentation.

20. In the process of making a fertilizer material, the step consisting of saturating a cellulose material with an aqueous nutrient solution containing sodium dibenzylsulphoadipate, thence decomposing the material so treated by fermentation.

21. In the process of making a fertilizer material, the step consisting of saturating a cellulose material with an aqueous nutrient solution containing dibutyl sodium sulphosebacate, thence decomposing the material so treated by fermentation.

22. In the process of making a fertilizer material, the step consisting of saturating a cellulose material with an aqueous nutrient solution containing sodium distearylsulphosuccinate, thence decomposing the material so treated by fermentation.

23. In the process of making a fertilizer material, the step consisting of saturating a cellulose material with an aqueous nutrient solution containing a sulphonated vegetable oil, thence decomposing the material so treated by fermentation.

MARTIN LEATHERMAN.

CERTIFICATE OF CORRECTION.

Patent No. 2,218,695.　　　　　　　　　　　　　　October 22, 1940.

MARTIN LEATHERMAN.

It is hereby certified that error appears in the above numbered patent requiring correction as follows: In the grant, lines 1, 2 and 3, strike out the semicolon and words "; dedicated to THE FREE USE OF THE PEOPLE OF THE UNITED STATES OF AMERICA"; lines 13 and 14, for "Martin Leatherman, for the free use of the People of the United States of America" read --Martin Leatherman, his heirs or assigns--; line 17, after "thereof." insert the following sentence -

Provided, however, that the said invention may be manufactured and used by or for the Government for governmental purposes without the payment of any royalty thereon.;

in the heading to the printed specification, lines 3, 4 and 5, strike out "; dedicated to the free use of the People of the United States of America"; and that the said Letters Patent should be read with this correction therein that the same may conform to the record of the case in the Patent Office.

Signed and sealed this 14th day of January, A. D. 1941.

Henry Van Arsdale, (Seal)　　　　　　　　　　　　　　　　Acting Commissioner of Patents.